US007277564B2

United States Patent
Yarger et al.

(10) Patent No.: US 7,277,564 B2
(45) Date of Patent: Oct. 2, 2007

(54) METHOD AND SYSTEM FOR LABELING OF ORTHOGONAL IMAGES

(75) Inventors: Richard William Ira Yarger, Schaumburg, IL (US); Muthu Venkatesh Muthuraj, Kenosha, WI (US); Neil Dominic D'Souza, Mt. Prospect, IL (US); Steven Bradley Taves, Arlington Heights, IL (US)

(73) Assignee: GE Medical Systems Information Technologies, Inc., Milwaukee, WI (US)

( * ) Notice: Subject to any disclaimer, the term of this patent is extended or adjusted under 35 U.S.C. 154(b) by 792 days.

(21) Appl. No.: 10/065,869

(22) Filed: Nov. 26, 2002

(65) Prior Publication Data

US 2004/0101175 A1 May 27, 2004

(51) Int. Cl.
G06K 9/00 (2006.01)
A61B 6/03 (2006.01)

(52) U.S. Cl. .................. 382/128; 382/131; 378/20

(58) Field of Classification Search ................ 382/128, 382/130–133; 600/410; 378/20
See application file for complete search history.

(56) References Cited

U.S. PATENT DOCUMENTS 5,734,915 A      3/1998   Roewer ...................... 715/512
5,749,834 A  *   5/1998   Hushek ....................... 600/410
5,891,030 A  *   4/1999   Johnson et al. ............ 382/128
6,117,079 A      9/2000   Brackett et al. ............ 600/437
6,125,350 A      9/2000   Dirbas ........................... 705/2
6,260,021 B1     7/2001   Wong et al. ................... 705/2
6,301,497 B1    10/2001   Neustadter ................... 600/410
6,359,960 B1     3/2002   Wahl et al. .................... 378/20
6,411,836 B1     6/2002   Patel et al. ................... 600/407

OTHER PUBLICATIONS

Great Britain Search Report, GB0327534.4, May 14, 2004.

* cited by examiner

Primary Examiner—Duy M. Dang
(74) Attorney, Agent, or Firm—Cantor Colburn LLP

(57) ABSTRACT

An imaging system employs method of labeling orthogonal images. The method comprises: identifying a primary image taken in a first plane; identifying a plurality of secondary images taken in planes orthogonal to the first plane; associating a label to a point in the primary image; calculating a distance from the point to a line of intersection between the primary image and each secondary image in the plurality of images; and associating the label to a secondary image in the plurality of secondary images having a line of intersection with the primary image closest to the point.

23 Claims, 3 Drawing Sheets

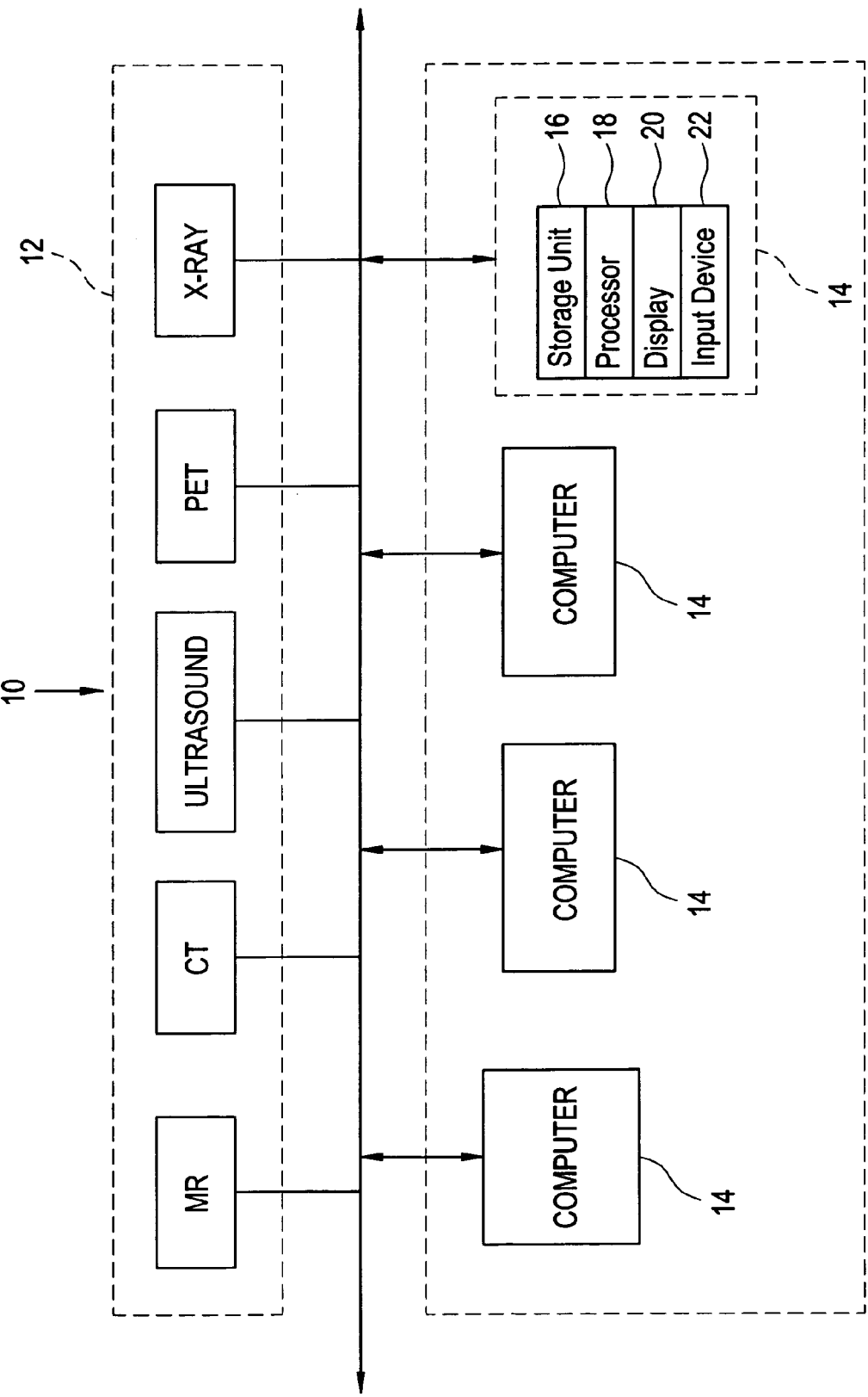

METHOD AND SYSTEM FOR LABELING OF ORTHOGONAL IMAGES

BACKGROUND OF THE INVENTION

This invention relates to image labeling. More particularly, the invention relates to the labeling of orthogonal images.

An imaging system uses, among others, electromagnetic radiation, x-rays, sonic waves, or photonic energy to produce images of a target body, such as a human patient. The images produced by the imaging system provide views of the target body at various planes extending through the target body. For many applications, a primary image is taken along one plane, and corresponding secondary images are taken at multiple planes extending orthogonal to the primary image.

The imaging system also includes a computer or network of computers to store, manage, display, and retrieve the images. The computers may be part of an image management system, such as a picture archiving and communications system (PACS). To aid in the application of the images for diagnosis, analysis, and the like, the imaging system may allow the images to be labeled (annotated) by a technician, physician, or other user. Labeling is typically accomplished using an input device to indicate a point on a displayed image and to input or select the appropriate label (notation) to be displayed at the indicated point. The label appears on the displayed image, and is associated with the image in computer memory such that when the image is retrieved at a later time, the label appears on the displayed image. Where the label is made on the primary image, it is often required that a label appear on the secondary image associated with the point on the primary image selected by the pointing device. This allows the label to act as a point of reference between the two images.

One example of such annotation is known as "spine labeling", which is the act of placing a text annotation near a vertebra of an imaged human spine. In the imaging of the human spine, a primary image may be taken in the sagittal plane (looking from the left or right side of the body), and one or more series of secondary images may be taken in the axial plane (looking from above the head or below the feet). Each series of secondary images contains a plurality of secondary images. Spine labeling includes placing a label near a vertebra of an imaged spine to serve as a point of reference for anyone viewing the image. The same label is also placed on the secondary image including the vertebra in each series of secondary images. Typically, such labels are used before neurosurgery or orthopedic surgery, for radiation therapy planning, and for interventional radiological procedures.

The annotation of orthogonal images can be time consuming. The person performing the annotation must label the primary image as well as the appropriate secondary image in each series. Care must be taken to ensure that the labels are placed consistently in each of the images.

BRIEF SUMMARY OF THE INVENTION

The above-described drawbacks and deficiencies are overcome or alleviated by a method of labeling orthogonal images, the method comprising: identifying a primary image taken in a first plane; identifying a plurality of secondary images taken in planes orthogonal to the first plane; associating a label to a point in the primary image; calculating a distance from the point to a line of intersection between the primary image and each secondary image in the plurality of images; and associating the label to a secondary image in the plurality of secondary images having a line of intersection with the primary image closest to the point.

In another aspect, a system for acquiring images of a target body comprises an imaging device and a computer. The imaging device is configured to provide a primary image and a plurality of secondary images of the target body, the primary image being taken at a first plane through the target body and the secondary images being taken at second planes through the target body. The computer is configured to receive the primary and secondary images from the imaging device. The computer is further configured to associate a first label to a point in the primary image, calculate a distance from the point to a line of intersection between the primary image and each secondary image in the plurality of images, and associate a second label to a secondary image in the plurality of secondary images having a line of intersection with the primary image closest to the point.

The above discussed and other features and advantages of the present invention will be appreciated and understood by those skilled in the art from the following detailed description and drawings.

BRIEF DESCRIPTION OF THE DRAWINGS

Referring to the exemplary drawings wherein like elements are numbered alike in the several Figures:

FIG. 1 is a block diagram of an imaging system that employs an embodiment of the present invention;

DETAILED DESCRIPTION OF THE INVENTION

Figure 3:
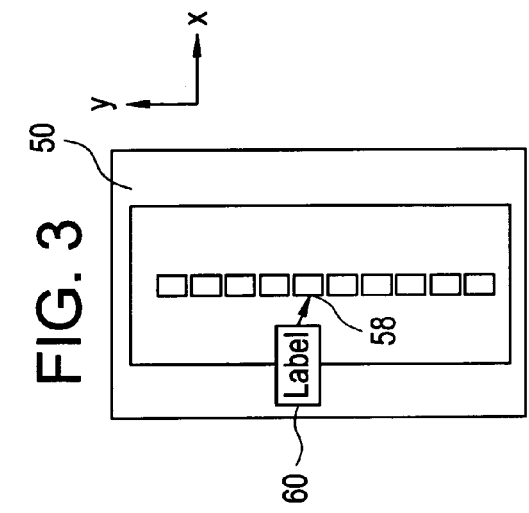
FIG. 3 is a schematic representation of an image of the target body taken in one plane.

Referring to FIG. 1, an imaging system 10 is shown. Imaging system 10 includes one or more imaging devices 12 coupled to one or more computers 14. Imaging devices 12 include, but are not limited to, magnetic resonance (MR) imaging devices, computed tomography (CT) devices, ultrasound devices, x-ray devices, positron emission tomography (PET) devices and a variety of other types of imaging devices. It should be understood that imaging devices 12 are not limited to medical imaging devices and can also include scanners and imaging devices from other fields. Imaging devices 12 may be located throughout a facility, such as a hospital.

Each of the computers 14 includes a storage unit 16, a processor 18, a display 20, and an input device 22. Input device 22 can include, but is not limited to, a mouse, a joystick, a keyboard, a trackball, a touch screen, a light wand, and a voice control. The one or more computers 14 may be coupled to the imaging devices 12 via wiring, printed circuit board, or other direct connection means. Alternatively, the one or more computers 14 may be coupled to the imaging devices 12 via a communications network (e.g., an ether net, internet, fiber optic, infrared, radio frequency, or other applicable communications network), allowing the computers 14 to be located remotely from the imaging devices 12 and from each other.

The one or more computers 14 may be part of an image management system, such as a picture archiving and communications system (PACS). In this embodiment, one of the computers 14 may serve the function of an image manager or system server, including an archival storage unit (e.g., an optical disc storage and optical disc reader system) for long-term storage and retrieval (not shown). The other computers 14 may serve as workstations.

During an examination of a target body, such as a portion of a patient's anatomy, one or more imaging devices 12 are used to acquire images of the target body. Each acquired image is in a digitized data format, such as DICOM, DEFF, TIFF, GIF, JPEG, TGA, BMP, PCX, XWD, PBM, PGM, PPM, SGI RGB, Sun Raster, PostScript Levels I and II, or other suitable format, and is communicated from imaging devices 12 to one or more of the computers 14. At least one computer 14 stores the acquired images, with appropriate identifiers and links such that the images or series of images can be selectively retrieved from computer memory.

Figure 2:
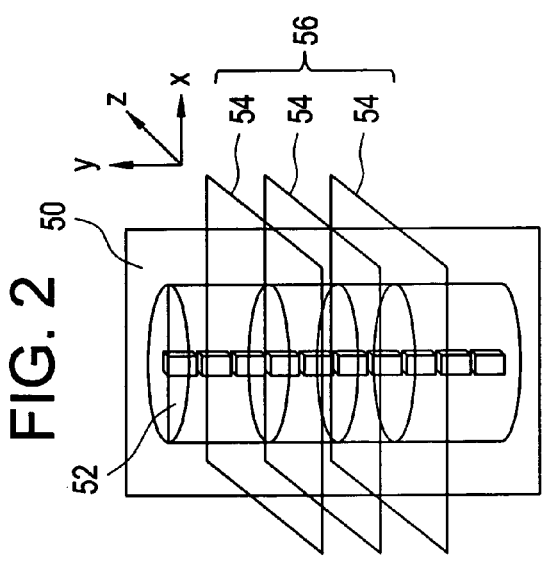
FIG. 2 is a schematic diagram of a plurality of images displayed relative to a target body.

Referring to FIGS. 1 and 2, one or more imaging devices 12 acquires a primary image 50 taken along one plane (e.g., the x-y plane of FIG. 2) extending through a target body 52. The one or more imaging devices 12 also acquires one or more series 56 of secondary images 54 taken at multiple planes orthogonal to the primary image 50 plane (e.g., the x-z plane of FIG. 2). Each series 56 of secondary images 54 contains a plurality of secondary images 54. The imaging performed by imaging devices 12 may include, for example, the imaging of a human spine, where primary image 50 is taken in the sagittal plane (looking from the left or right side of the body), and one or more series 56 of secondary images 54 are taken in the axial plane (looking from above the head or below the feet). It will be appreciated, however, that the terms "primary" and "secondary" are used herein only for clarity and do not indicate specific views, planes, or the sequence in which the images 50 or 54 are acquired.

To aid in the application of the images 50 and 54 for diagnosis, analysis, and the like, the computers 14 allow the images 50 and 54 to be annotated (labeled) by a technician, physician, or other user. Annotation is accomplished using input device 22 to indicate a point 58, as shown in FIG. 3, on primary image 50 and to input or select the appropriate label (notation) 60 to be displayed at the indicated point 58. The label 60 appears on the displayed primary image 50, and is associated with the primary image 50 in computer 14 such that when the primary image 50 is retrieved at a later time, the label 60 appears on the displayed primary image 50. The association between the label 60 and the primary image 50 in computer 14 maybe performed using any suitable means such as, for example, database linking, pointers, data structures, objects, and direct alteration of the primary image 50.

Figure 4:
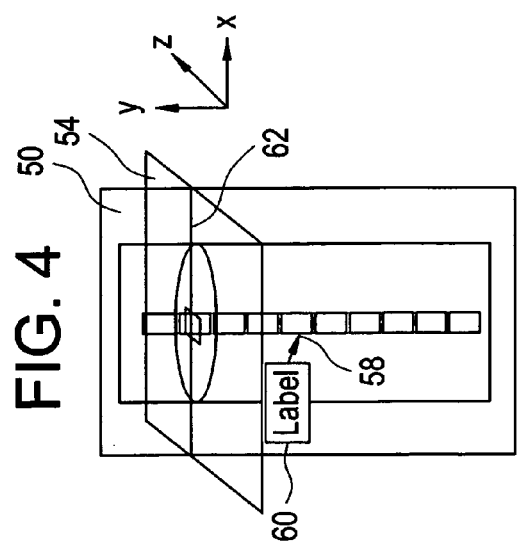
FIG. 4 is a schematic representation of orthogonal images of the target body.

The storage unit 16 in one or more of the computers 14 includes instructions for causing the computer 14 to implement a method for labeling the secondary images 54. The decision of which secondary image 54 will get the label 60 is based on the spatial relationships between the primary image 50 and each of the secondary images 54. Since the primary 50 image and secondary images 54 are in orthogonal (perpendicular) planes, the secondary images 54 intersect the primary image 50 plane at a line of intersection 62, as shown in FIG. 4. The distance from each point 58 in the primary image 50 to the location of each line of intersection 62 in the primary image plane may be calculated using the equation:

$$\frac{ax_0 + by_0 + c}{\sqrt{a^2 + b^2}} \quad (1)$$

where $ax_0+by_0+c$ is the line of intersection 62, and $(x_0, y_0)$ is the point 58 in the primary image 50.

Figure 5:
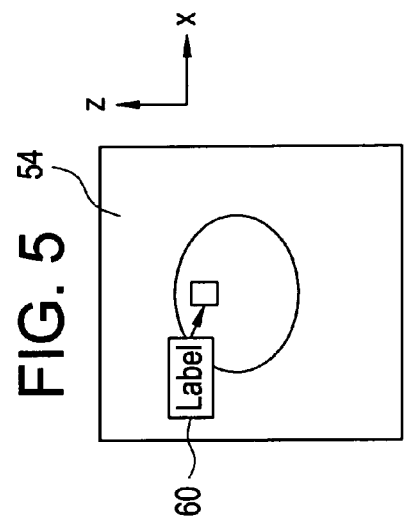
FIG. 5 is a schematic representation of an image of the target body taken in a plane orthogonal to the image of FIG. 3.

Thus, the label 60 on the secondary image 54, shown in FIG. 5, is a reflection of the label 60 in the primary image 50, shown in FIG. 3.

The label 60 applied to the secondary image 54 is associated with the secondary image 54 in computer 14 such that when the secondary image 54 is retrieved at a later time, the label 60 appears on the displayed secondary image 54. The association between the label 60 and the secondary image 54 in computer 14 may be performed using any suitable means such as, for example, database linking, pointers, data structures, objects, and direct alteration of the secondary image 54.

The label 60 applied to the secondary image 54 may be the same instance of the label 60 applied to the primary image 50 (e.g., the same instance of a label object, database element, data structure, or the like). In this embodiment, any changes to the label 60 made in one image 50 or 54 will be affected in the other image 50 or 54. Such changes may include, for example deletion of the label 60, changing of the label 60 text, or movement of the point 58 to which the label 60 is applied. Alternatively, the label 60 applied to the secondary image 54 may be different than the label 60 applied to the primary image 50. In this embodiment, the instances of each label 60 are associated in computer 14 such that changes in the label 60 made in one image 50 or 54 will be affected in the other image 50 or 54. The association between the labels 60 in each of the images 50 and 54 may be performed using any suitable means such as, for example, database linking, pointers, data structures, and objects.

Figure 6:
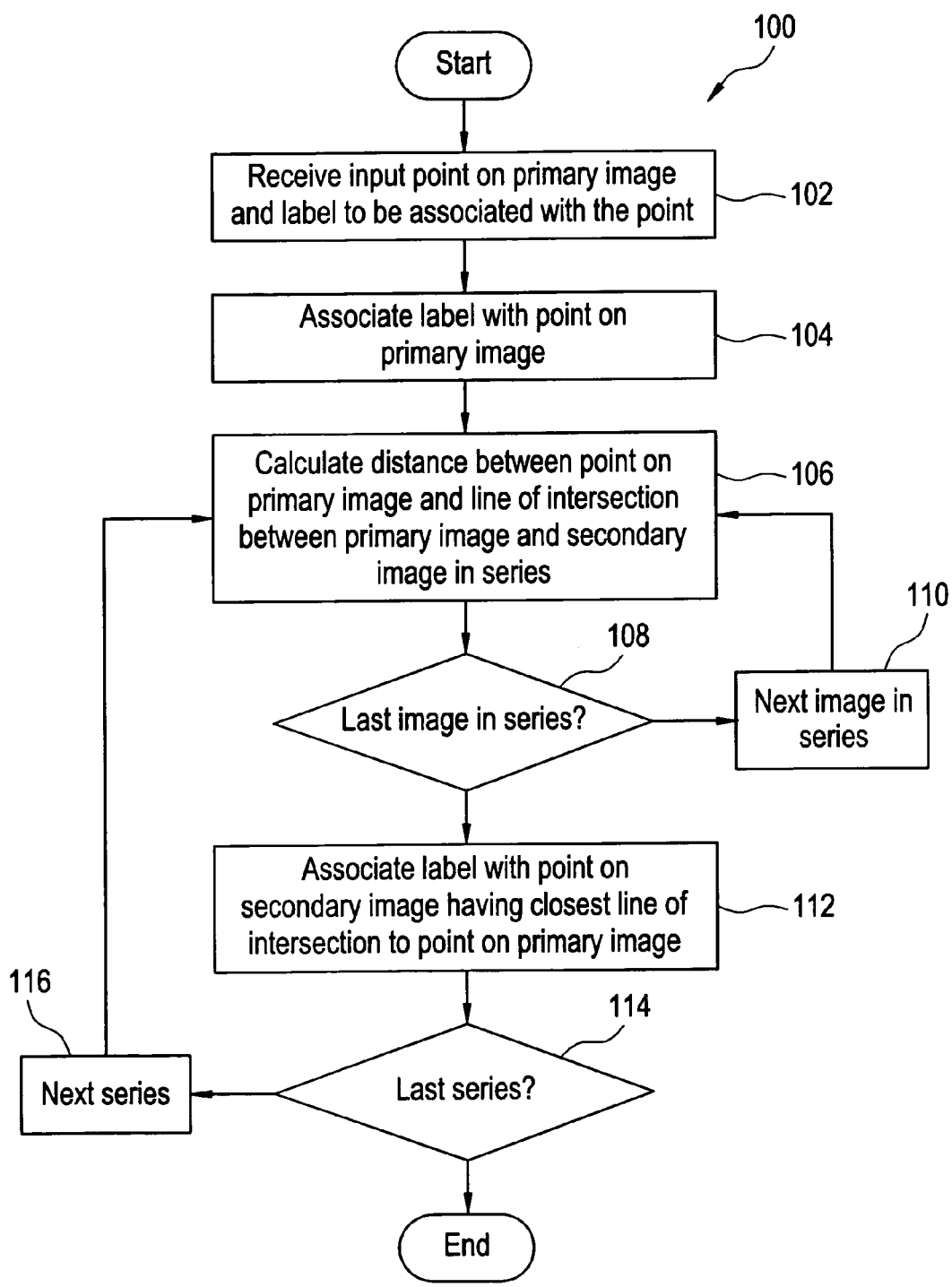
FIG. 6 is flow chart depicting a method of labeling orthogonal images.

FIG. 6 is a flow chart depicting an embodiment of the method for labeling secondary images 54. Upon starting, method 100 begins at block 102, where the point 58 on primary image 50 and the desired label 60 are input from input device 22. Method 100 continues at block 104 where the label 60 is associated with the point 58 on the primary image 50 in computer 14. The label 60 may also be displayed along with primary image 50 on display 20. At block 106, a distance between the point 58 on the primary image 50 and the line of intersection 62 between the primary image 50 and the first secondary image 54 in the first series 56 of images is calculated. This calculation may be performed using equation (1), above. Method 100 then continues to block 108 where it is determined whether the secondary image 54 is the last image in the series 56. If not, the next secondary image 54 in the series 56 is selected in block 110, and method 100 repeats the calculation at block 106 for this next image. If, in block 108, it is determined that the secondary image 54 is the last image in the series 56, method 100 continues to block 112, where the secondary image 54 having the closest line of intersection 62 to the point 58 on the primary image 50 is determined, and a label 60 is associated with this secondary image 54. As previously noted, this label 60 may be the same label as applied to the primary image 50 in block 104, or may be a different label.

Method 100 then continues to block 114, where it is determined whether the series 56 is the last series to be labeled. If not, the next series 56 is selected at block 116, and method 100 continues at blocks 106 through 112 to label this next series 56. If, in block 114, the last series 56 of images has been labeled, method 100 ends.

The method and system described herein saves time and effort in labeling orthogonal images. The person performing the labeling need only label the primary image, and the appropriate secondary image in each series are automatically labeled. The method and system described herein also ensures that the labels are placed consistently in each of the images.

The present invention can be embodied in the form of computer-implemented processes and apparatuses for practicing those processes. The present invention can also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, primary, secondary, etc. do not denote any order or importance, but rather the terms first, second, primary, secondary etc. are used to distinguish one element from another.

What is claimed is:

1. A method of labeling orthogonal images, the method comprising:
    identifying a primary image taken in a first sagittal plane;
    identifying a plurality of secondary images taken in axial planes orthogonal to the first sagittal plane;
    associating a label to a point in the primary image;
    calculating a distance from the point to a line of intersection between the primary image and each secondary image in the plurality of images; and
    associating the label to a secondary image in the plurality of secondary images having a line of intersection with the primary image closest to the point.

2. The method of claim 1, wherein the plurality of secondary images is a first plurality of secondary images, further comprising:
    identifying a second plurality of secondary images taken in axial planes orthogonal to the first sagittal plane;
    calculating a distance from the point to a line of intersection between the primary image and each secondary image in the second plurality of images; and
    associating the label to a secondary image in the second plurality of secondary images having a line of intersection with the primary image closest to the point.

3. The method of claim 1, wherein the point in the primary image is a first point in the primary image, further comprising:
    associating the label to a second point in the primary image;
    calculating a distance from the second point to a line of intersection between the primary image and each secondary image in the plurality of images; and
    associating the label to a secondary image in the plurality of secondary images having a line of intersection with the primary image closest to the second point.

4. The method of claim 1, wherein:
    the associating the label to the point in the primary image occurs subsequent to the identifying the primary image taken in the first sagittal plane and the identifying the plurality of secondary images taken in axial planes orthogonal to the first sagittal plane;
    the associating the label to the point in the primary image comprises:
    indicating a point on the primary image; and
    selecting a notation to be displayed at the indicated point.

5. A method of labeling orthogonal images, the method comprising:
    identifying a primary image taken in a first sagittal plane;
    identifying a plurality of secondary images taken in axial planes orthogonal to the first sagittal plane;
    associating a first label to a point in the primary image;
    calculating a distance from the point to a line of intersection between the primary image and each secondary image in the plurality of images; and
    associating a second label to a secondary image in the plurality of secondary images having a line of intersection with the primary image closest to the point.

6. The method of claim 5, wherein the plurality of secondary images is a first plurality of secondary images, further comprising:
    identifying a second plurality of secondary images taken in axial planes orthogonal to the first sagittal plane;
    calculating a distance from the point to a line of intersection between the primary image and each secondary image in the second plurality of images; and
    associating the second label to a secondary image in the second plurality of secondary images having a line of intersection with the primary image closest to the point.

7. The method of claim 5, wherein the point in the primary image is a first point in the primary image, further comprising:
    associating the first label to a second point in the primary image;
    calculating a distance from the second point to a line of intersection between the primary image and each secondary image in the plurality of images; and
    associating the second label to a secondary image in the plurality of secondary images having a line of intersection with the primary image closest to the second point.

8. The method of claim 5, further comprising:
    copying text associated with the first label to the second label.

9. The method of claim 5, further comprising:
deleting the second label upon deletion of the first label.

10. A computer readable medium encoded with machine-readable computer program code for labeling orthogonal images, the computer readable medium including instructions for causing a computer to implement a method comprising:
identifying a primary image taken in a first sagittal plane;
identifying a plurality of secondary images taken in axial planes orthogonal to the first sagittal plane;
associating a label to a point in the primary image;
calculating a distance from the point to a line of intersection between the primary image and each secondary image in the plurality of images; and
associating the label to a secondary image in the plurality of secondary images having a line of intersection with the primary image closest to the point.

11. The computer readable medium of claim 10, wherein the plurality of secondary images is a first plurality of secondary images, wherein the method further comprises:
identifying a second plurality of secondary images taken in axial planes orthogonal to the first sagittal plane;
calculating a distance from the point to a line of intersection between the primary image and each secondary image in the second plurality of images; and
associating the label to a secondary image in the second plurality of secondary images having a line of intersection with the primary image closest to the point.

12. The computer readable medium of claim 10, wherein the point in the primary image is a first point in the primary image, wherein the method further comprises:
associating the label to a second point in the primary image;
calculating a distance from the second point to a line of intersection between the primary image and each secondary image in the plurality of images; and
associating the label to a secondary image in the plurality of secondary images having a line of intersection with the primary image closest to the second point.

13. A computer readable medium encoded with machine-readable computer program code for labeling orthogonal images, the computer readable medium including instructions for causing a computer to implement a method comprising:
identifying a primary image taken in a first sagittal plane;
identifying a plurality of secondary images taken in axial planes orthogonal to the first sagittal plane;
associating a first label to a point in the primary image;
calculating a distance from the point to a line of intersection between the primary image and each secondary image in the plurality of images; and
associating a second label to a secondary image in the plurality of secondary images having a line of intersection with the primary image closest to the point.

14. The computer readable medium of claim 13, wherein the plurality of secondary images is a first plurality of secondary images, wherein the method further comprises:
identifying a second plurality of secondary images taken in axial planes orthogonal to the first sagittal plane;
calculating a distance from the point to a line of intersection between the primary image and each secondary image in the second plurality of images; and
associating the second label to a secondary image in the second plurality of secondary images having a line of intersection with the primary image closest to the point.

15. The computer readable medium of claim 13, wherein the point in the primary image is a first point in the primary image, wherein the method further comprises:
associating the first label to a second point in the primary image;
calculating a distance from the second point to a line of intersection between the primary image and each secondary image in the plurality of images; and
associating the second label to a secondary image in the plurality of secondary images having a line of intersection with the primary image closest to the second point.

16. The computer readable medium of claim 13, wherein the method further comprises:
copying text associated with the first label to the second label.

17. The computer readable medium of claim 13, wherein the method further comprises:
deleting the second label upon deletion of the first label.

18. A system for acquiring images of a target body, the system comprising:
an imaging device configured to provide a primary image and a plurality of secondary images of the target body, the primary image being taken at a first sagittal plane through the target body and the secondary images being taken at second axial planes through the target body and orthogonal to the first sagittal plane;
a computer configured to receive the primary and secondary images from the imaging device, the computer further configured to:
associate a label to a point in the primary image;
calculate a distance from the point to a line of intersection between the primary image and each secondary image in the plurality of images; and
associate the label to a secondary image in the plurality of secondary images having a line of intersection with the primary image closest to the point.

19. The system of claim 18, wherein the plurality of secondary images is a first plurality of secondary images, wherein the imaging device is further configured to provide a second plurality of secondary images taken in axial planes orthogonal to the first sagittal plane; and
wherein the computer is further configured to:
calculate a distance from the point to a line of intersection between the primary image and each secondary image in the second plurality of images, and
associate the label to a secondary image in the second plurality of secondary images having a line of intersection with the primary image closest to the point.

20. The method of claim 18, wherein the point in the primary image is a first point in the primary image, wherein the computer is further configured to:
associate the label to a second point in the primary image;
calculate a distance from the second point to a line of intersection between the primary image and each secondary image in the plurality of images; and
associate the label to a secondary image in the plurality of secondary images having a line of intersection with the primary image closest to the second point.

21. A system for acquiring images of a target body, the system comprising:
an imaging device configured to provide a primary image and a plurality of secondary images of the target body, the primary image being taken at a first sagittal plane through the target body and the secondary images being taken at second axial planes through the target body and orthogonal to the first sagittal plane;

a computer configured to receive the primary and secondary images from the imaging device, the computer further configured to:

associate a first label to a point in the primary image;

calculate a distance from the point to a line of intersection between the primary image and each secondary image in the plurality of images; and associate a second label to a secondary image in the plurality of secondary images having a line of intersection with the primary image closest to the point.

22. The system of claim 21, wherein the plurality of secondary images is a first plurality of secondary images, wherein the computer is further configured to:

identify a second plurality of secondary images taken in axial planes orthogonal to the first sagittal plane;

calculate a distance from the point to a line of intersection between the primary image and each secondary image in the second plurality of images; and associate the second label to a secondary image in the second plurality of secondary images having a line of intersection with the primary image closest to the point.

23. The system of claim 21, wherein the point in the primary image is a first point in the primary image, wherein the computer is further configured to:

associate the first label to a second point in the primary image;

calculate a distance from the second point to a line of intersection between the primary image and each secondary image in the plurality of images; and associate the second label to a secondary image in the plurality of secondary images having a line of intersection with the primary image closest to the second point.

* * * * *